(12) United States Patent
Martinez Alcantara

(10) Patent No.: US 11,592,227 B2
(45) Date of Patent: Feb. 28, 2023

(54) SELF-SUSTAINABLE MULTIPLE-TANK COOLER WITH ENERGY STORAGE AND CHAMBER FOR TEMPERATURE COMPENSATION

(71) Applicants: Jose De Jesus Martinez Alcantara, Iztacalco (MX); Jorge Manuel Civeira Rodriguez, Queretaro (MX)

(72) Inventor: Jose De Jesus Martinez Alcantara, Iztacalco (MX)

( * ) Notice: Subject to any disclaimer, the term of this patent is extended or adjusted under 35 U.S.C. 154(b) by 363 days.

(21) Appl. No.: 16/772,523

(22) PCT Filed: Feb. 20, 2018

(86) PCT No.: PCT/IB2018/051016
§ 371 (c)(1),
(2) Date: Jun. 12, 2020

(87) PCT Pub. No.: WO2019/116111
PCT Pub. Date: Jun. 20, 2019

(65) Prior Publication Data
US 2020/0386465 A1 Dec. 10, 2020

(30) Foreign Application Priority Data
Dec. 13, 2017 (CO) .......................... NC2017/0012831

(51) Int. Cl.
*F25D 16/00* (2006.01)
*F25D 13/02* (2006.01)
*F25B 13/00* (2006.01)
*F28D 20/02* (2006.01)
*F25D 11/00* (2006.01)

(52) U.S. Cl.
CPC .............. *F25D 13/02* (2013.01); *F25B 13/00* (2013.01); *F25D 11/006* (2013.01); *F25D 16/00* (2013.01); *F28D 20/02* (2013.01)

(58) Field of Classification Search
CPC .. F25D 11/006; F25D 16/00; F25D 2303/082; F25D 2303/0821; F25D 2303/0822; F25D 2303/08221
See application file for complete search history.

(56) References Cited

U.S. PATENT DOCUMENTS 3,747,364 A 7/1973 Laing
4,951,481 A * 8/1990 Negishi .................. F25D 16/00
62/438

(Continued)

FOREIGN PATENT DOCUMENTS

DE 3333026 A1 3/1985
JP H0318473 U 2/1991
WO 2016006490 A1 1/2016

OTHER PUBLICATIONS

Search Report and Written Opinion for PCT/IB2018/051016 dated Jun. 1, 2018.

(Continued)

*Primary Examiner* — Eric S Ruppert
(74) *Attorney, Agent, or Firm* — Neal, Gerber & Eisenberg LLP

(57) ABSTRACT

Cooler composed by an outer tank, within which a cooling tank and a useful tank are housed, among which there is an array of thermal energy accumulators, and within the tank useful there are temperature compensation chambers.

10 Claims, 11 Drawing Sheets

(56) References Cited

U.S. PATENT DOCUMENTS

| | | | |
|---|---|---|---|
| 6,020,575 A | | 2/2000 | Nagle et al. |
| 6,145,333 A | * | 11/2000 | Richmond ............ A47F 3/0452 |
| | | | 219/385 |
| 8,887,515 B2 | | 11/2014 | Patstone |
| 2013/0340467 A1 | | 12/2013 | Kiedaisch et al. |
| 2014/0338390 A1 | | 11/2014 | Pinto et al. |
| 2017/0023290 A1 | | 1/2017 | Demuth et al. |

OTHER PUBLICATIONS

International Preliminary Report on Patentability Chapter II dated Mar. 13, 2020 (23 pages).

* cited by examiner

SELF-SUSTAINABLE MULTIPLE-TANK COOLER WITH ENERGY STORAGE AND CHAMBER FOR TEMPERATURE COMPENSATION

CROSS-REFERENCE TO RELATED APPLICATIONS

This is a national stage patent application of PCT/IB2018/051016, filed on Feb. 20, 2018 entitled "SELF-SUSTAINABLE MULTIPLE-TANK COOLER WITH ENERGY STORE AND CHAMBER FOR TEMPERATURE COMPENSATION," and claims priority from Colombian Patent Application No. NC2017/0012831, filed Dec. 13, 2017, both of which are incorporated by reference in their entirety.

TECHNICAL FIELD

The present invention is directed to commercial refrigeration, corresponding to equipment incorporating eutectic plates. In particular, this invention is related to a cooler comprising multiple tanks and eutectic plates acting as thermal energy accumulators located between tanks.

BACKGROUND

It is well known in the art that low voltage faults and continuous electricity failures are quite frequent in some parts of the world.

Regardless of the country, power outages, particularly at peak hours, can happen at all times. It is evident that, during prolonged power failure, food stored within freezers deteriorates. Freezers are not able to maintain low temperatures for a long time. In this situation, just a deep freezer that can contain solid ice cream for 16 to 24 hours without a continuous power source is considered useful.

Considering this type of problems, it is common to use thermal energy accumulators for maintaining various products within a cooler during extended power failures. There are some isothermal containers designed to incorporate eutectic accumulators to maintain the cold chain. There are various isothermal devices configured in the state of the art so that their interior walls and surfaces allow to fit an eutectic solution in an embedded manner, such as patent applications WO2014090718, KR2004081288, FR2938901, EP794396, and EP1484562. The main disadvantages of these containers are the complicated construction by special molds or profiling, the process of filling the eutectic solution, as well as the difficulty of replacing the housing components during some maintenance maneuver.

Rather, foreseeing these disadvantages, the eutectic accumulators are generally formed in plastic containers in the form of eutectic plates, containing harmless liquid gels with the property of accumulating cooling thermal energy in order to prolong the freezing state of the refrigerated products. Additionally, there are isothermal devices designed to incorporate eutectic plates, which are adapted for maintaining the cold chain. Some isothermal device designs include a refrigeration system, wherein the eutectic plates increase the efficiency of the refrigeration system and can maintain the cold chain when the refrigeration system is deactivated. These systems including eutectic plates are capable of maintaining temperatures close to zero for periods of six to seven hours.

Various examples of such refrigeration systems exist in the State of the Art. For example, patent applications JP2002005551 and EP98052, as well as patent EP1124101 describe refrigeration equipment that adapt eutectic plates to the shelves of said equipment. On the other hand, patent applications WO1991019948, WO2009150473, EP0152155, DE3333026, JP2002139269, GB2534911, US20130340467, as well as U.S. Pat. No. 3,747,364 and US8887515, and utility model CN202002423 and CN204006896 also disclose adapting commercial and household refrigeration equipment with eutectic plates in the walls and inner surfaces, preferably interacting in close proximity to the evaporators. However, such refrigeration equipment cannot be regulated at mid temperatures, which are suitable for products such as meat and dairy, thereby providing low temperatures and a product that is introduced at these low temperatures may become frozen.

Similarly, patent application US20170023290 discloses a horizontal type refrigeration appliance having a known refrigeration circuit, which cools a cold chamber, wherein the side walls and the bottom of the cold chamber have an insulating assembly comprising coupling means for releasably receiving one or more cold accumulators. The main disadvantage of this refrigeration appliance is that the components of the assembly that allow for detachable coupling of the cold accumulators increase their manufacture costs and complicate their production. Even some of these mounting elements can hinder the heat transfer mechanisms from the evaporators to the cold chamber.

Finally, the patent application CN105960568 describes a horizontal type refrigeration container that houses a storage chamber wherein the side walls support eutectic plates adapted for the height of the storage chamber. The main disadvantage of this application is that the eutectic plates are adapted to the size of the chamber, which increase their manufacture costs and complicate their production. A further disadvantage is that the array of a single eutectic plate can hinder the heat transfer mechanisms from the evaporators to the storage chamber.

Therefore, there is a need in the State of the Art for having a refrigeration device incorporating eutectic accumulators in an array that enhances the heat transfer, and which is configured to preserve special products that need to be stored at certain average temperatures without reaching to the complete freezing of the product.

DESCRIPTION OF THE INVENTION

The invention relates to a self-sustaining cooler of multiple tanks, chambers for temperature compensation, thermal energy accumulators, and electronic control.

The self-sustaining cooler of the present invention has a substantially rectangular parallelepiped shape, defined by an outer cabinet or tank which is open on the upper side, wherein a slide cover allows access to the cold chamber located inside the cooler. Said cover may be of sliding or hinged, manual or automatic sliding doors, or others known in the State of the Art. More preferably, the upper cover may be made of any transparent material that allows to be viewed into the interior of the cooler, such as some type of glass or polymer. The cold chamber is divided into one or more zones that allow the accommodation of various products. In the preferred embodiment of the invention, the upper cover is slidable and is fabricated from low emissivity treated glass or which provides little radiation, for example, a coating commercially known as Low-e. Additionally, the body of the outer tank or cabinet can have on its lower base means for portability to facilitate the transport of the cooler of the present invention. Preferably, portability means are wheels, but other known elements that facilitate transportation can be used. Finally, the outer tank or cabinet can have access to an electronic control on any of its sides.

In the preferred embodiment of the invention, each wall and base of the outer tank or cabinet is made of galvanized sheet, preferably caliber 26, having an inner surface and an outer surface painted with insulation by expanded polyurethane. Moreover, the present invention also contemplates the possibility of each wall and base of the outer tank or cabinet may have a double bottom that creates one or more intermediate wall cavities. In a preferred embodiment, the body of the outer tank further has moldings in corners and ridges, as well as insulating elements for a suitable finish of the outer tank or cabinet.

On the lower base of the cabinet body, the refrigeration system is located comprising the classic refrigeration elements such as a compressor, condenser and fans for facilitating heat transfer to the outside of the condenser.

DETAILED DESCRIPTION OF THE INVENTION

Figure 1:
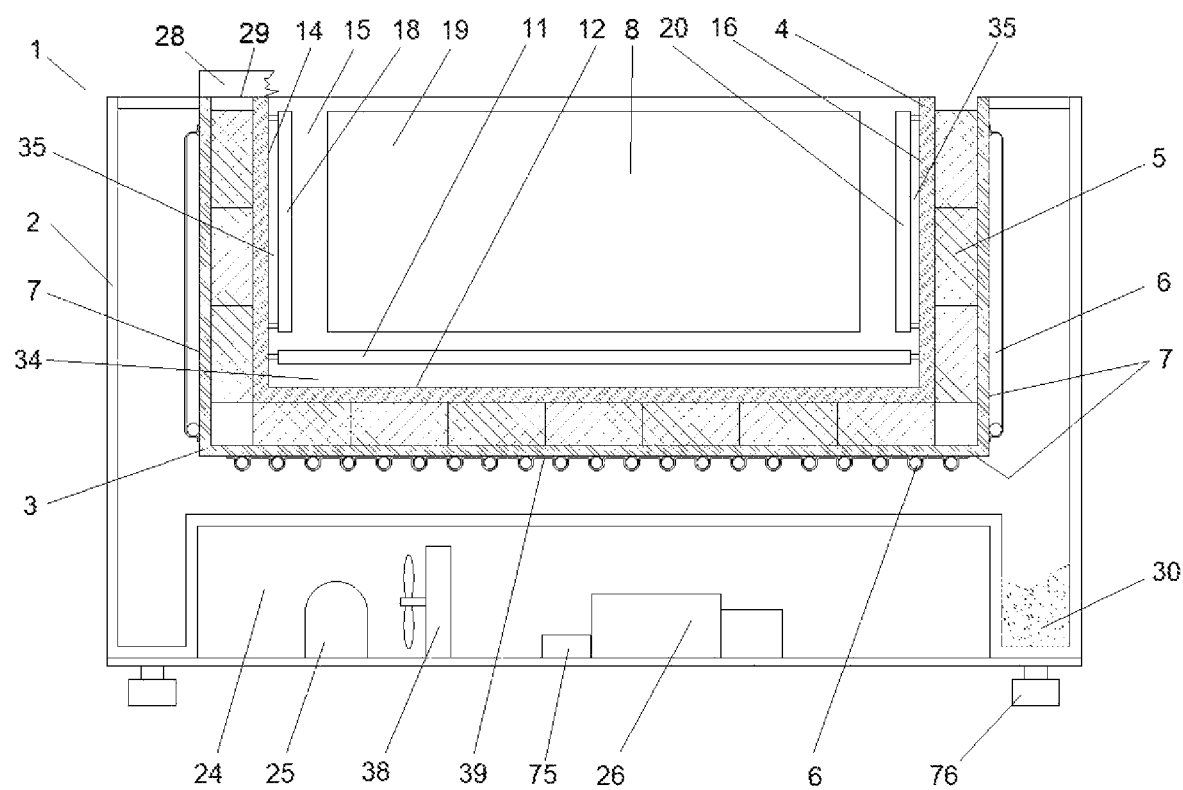
FIG. 1 depicts an elevational view of the cooler and its main components.
Figure 2:
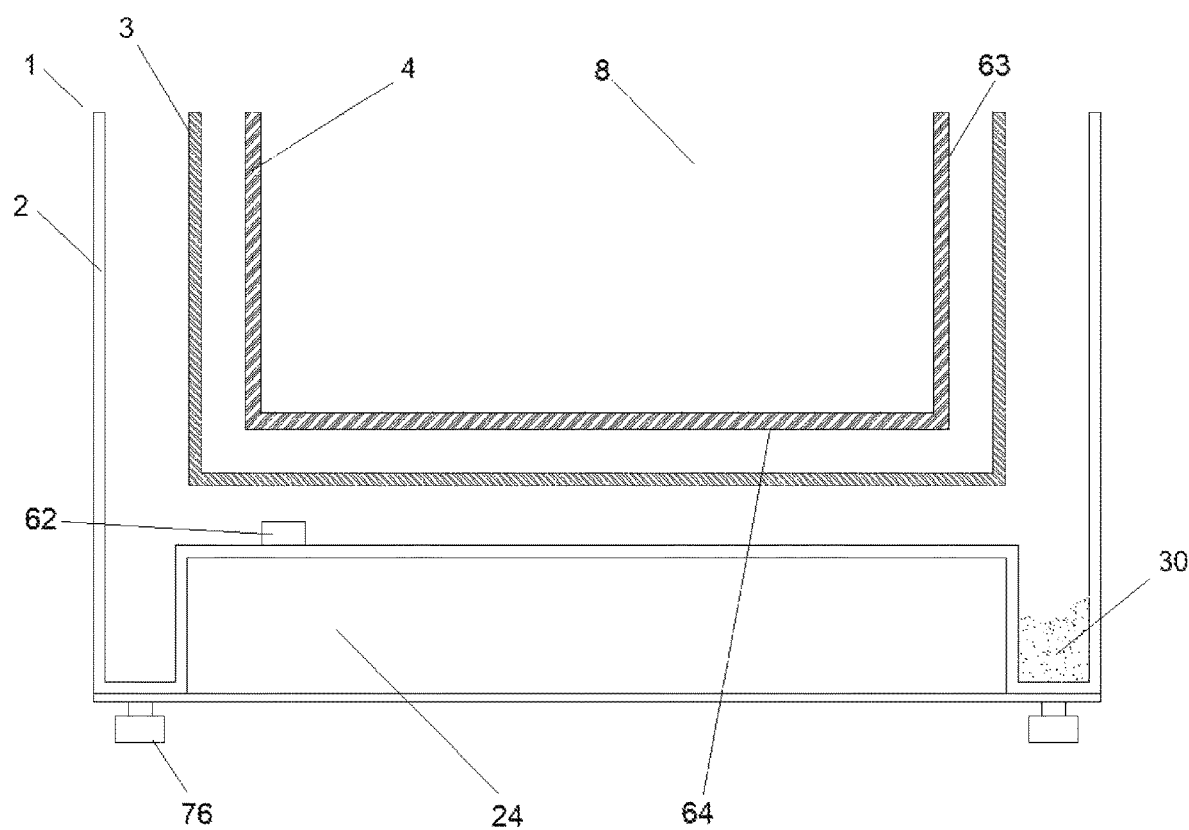
FIG. 2 depicts an elevational view of the array of the tanks comprising the cooler.

In accordance with FIGS. 1 and 2, the present invention discloses a self-sustaining multi-tank cooler (1) consisting of an outer tank or cabinet (2), into which a cooling tank (3) and a useful tank (4) are housed. Each tank is open at its top and spaced with respect to each other, that is, they are not in contact with the useful tank (4) being located inside the cooling tank (3), and said cooling tank (3) inside the outer tank (2).

Figure 3:
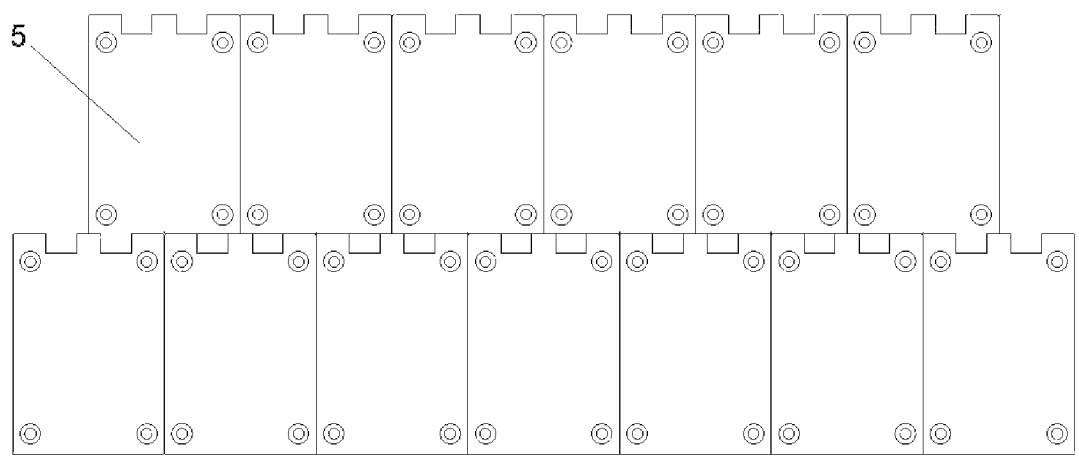
FIG. 3 depicts a detail of the array of eutectic plates.
Figure 11:
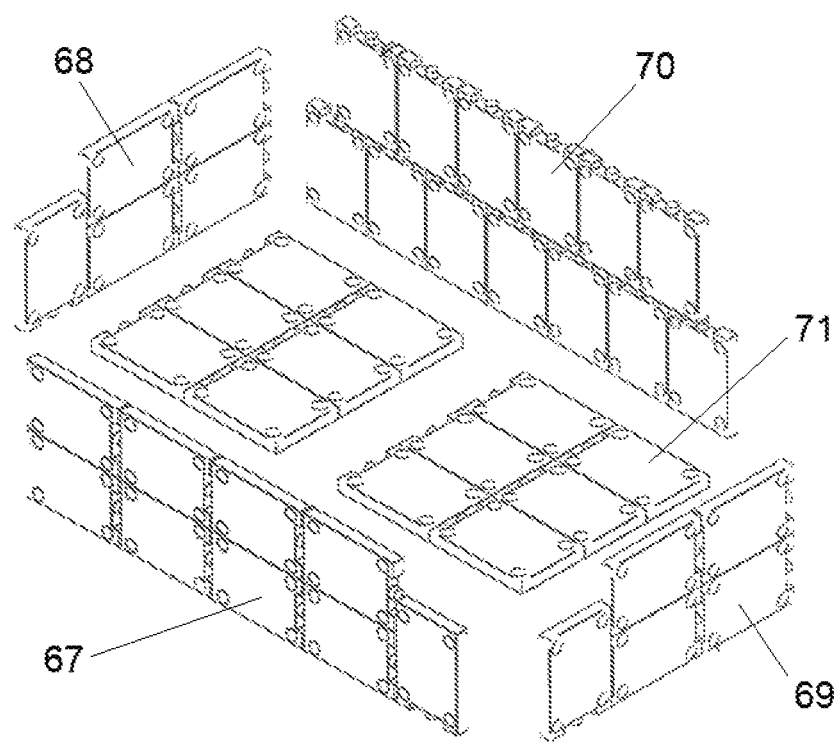
FIG. 11 depicts an isometric view of the array of the thermal energy accumulators (5).

Inside the space between the cooling tank (3) and the useful tank (4) an array of thermal energy accumulators (5) is housed, forming a thermal wall in contact with the inner faces of the cooling tank (3) and the outer faces of the useful tank (4), thereby totally or partially covering said faces, as can be seen in FIGS. 1, 3 and 11.

In all the space between the cooling tank (3) and the outer tank (2) a thermal insulator (30) is located, said insulator being an element of low thermal energy conductivity.

Figure 4:
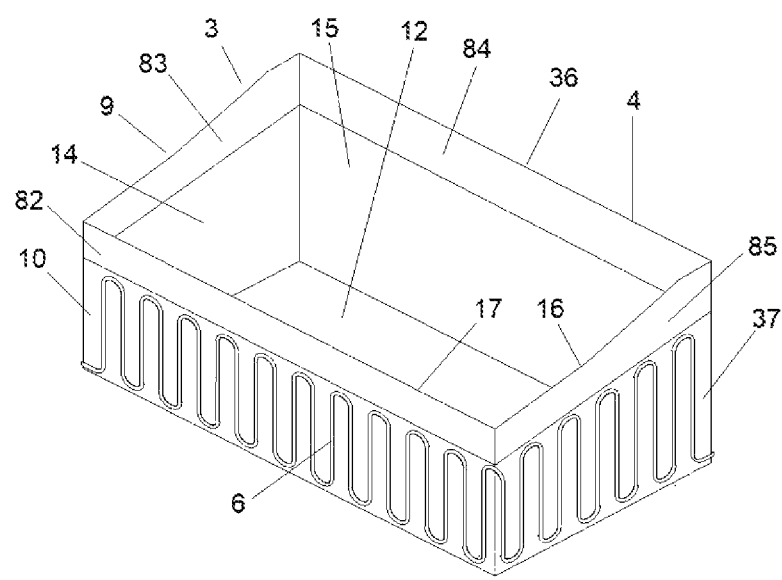
FIG. 4 depicts an isometric view of the cooling tank (3) and the array of the evaporator tubes (6).
Figure 5:
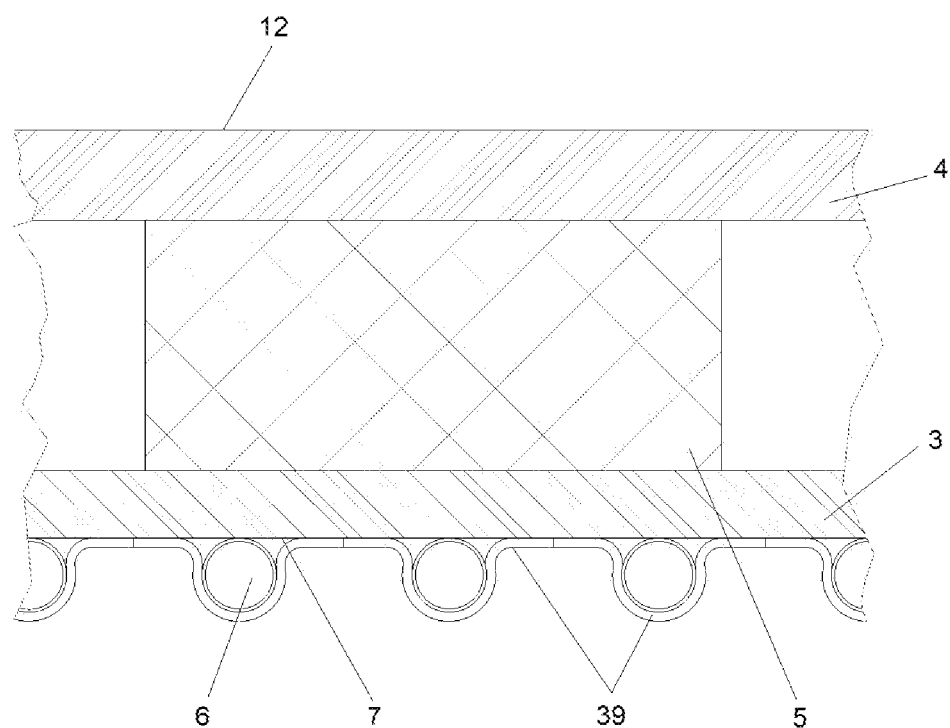
FIG. 5 depicts a detail of the array of the cooling tank (3) and the evaporator tubes (6), the thermal energy accumulators (5) and the aluminum layer (39).
Figure 10:
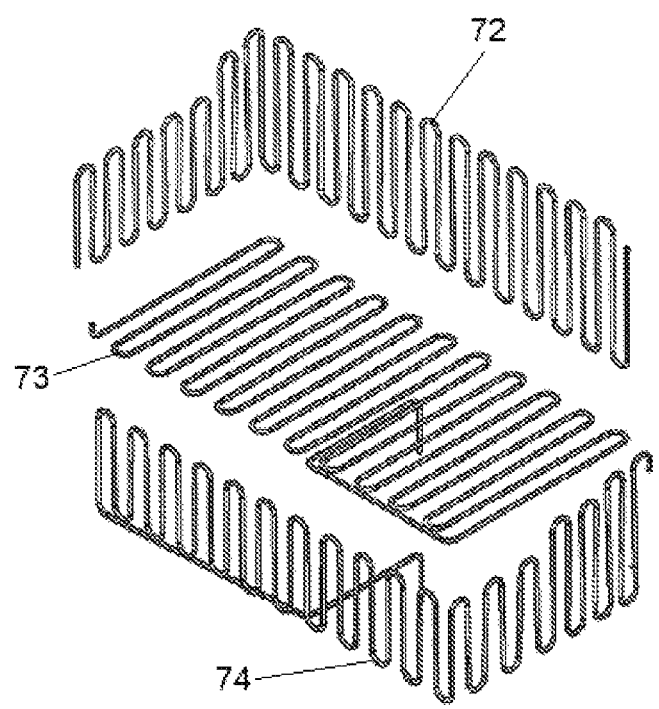
FIG. 10 depicts an isometric view of the sections (72), (73), (74) comprising the evaporator (6).

It is an important part of the self-sustaining cooler of multiple tanks (1) of the present invention, an evaporator (6) formed by copper tubing, which is in contact and distributed over all the outer faces (7) of the cooling tank (3). On said outer faces (9), (10), (36), (37), the evaporator tubes (6) are arranged parallel to each other, forming a coil located longitudinally in a vertical position, such as it is shown in FIG. 4. In a preferred embodiment, as shown in FIG. 10, the evaporator (6) is comprised of different sections (72), (73), (74).

An aluminum layer (39) covers and remains in contact with the evaporator tubes, said layer also contacts with the outer faces of the cooling tank (3).

Figure 6:
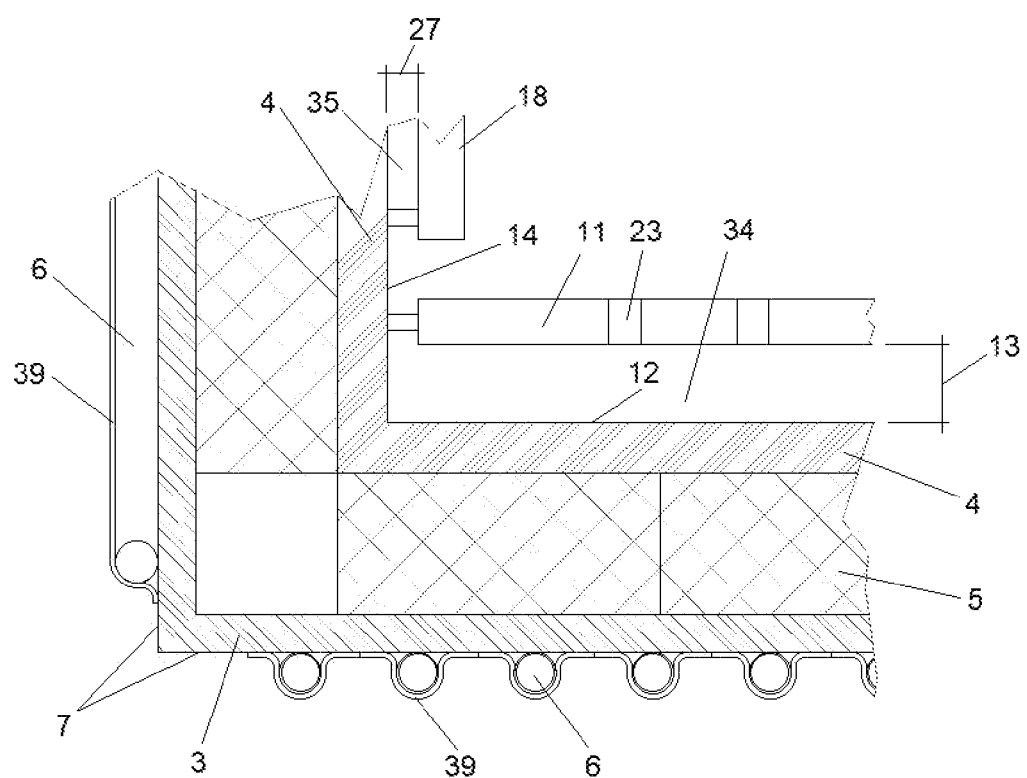
FIG. 6 depicts a detail of the cooling tank (3) and the temperature compensation chambers (34) and (35).
Figure 7:
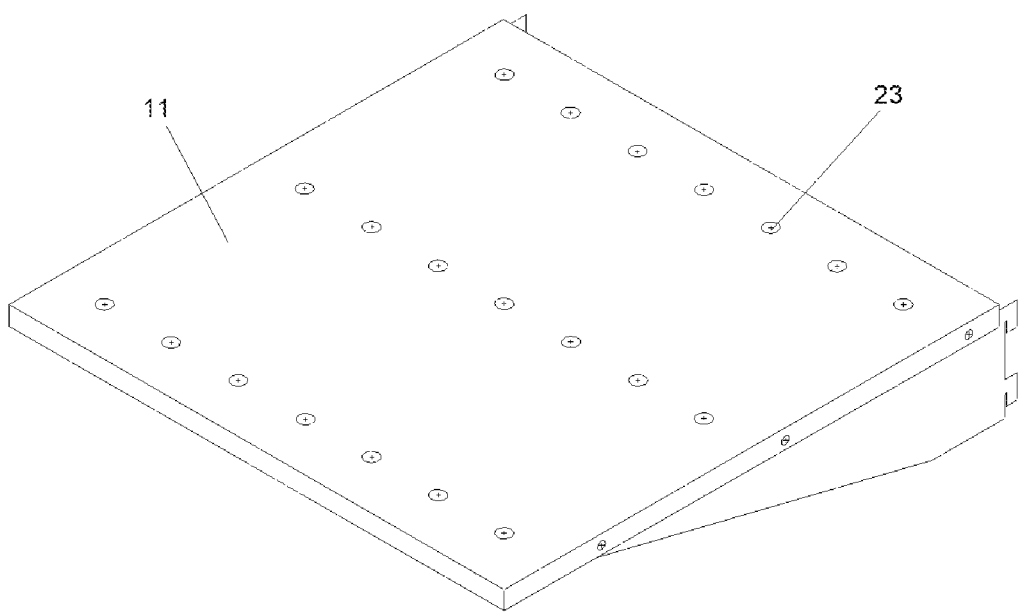
FIG. 7 depicts an isometric view of a lower anti freezing spacer (11) and the through holes (23).
Figure 8:
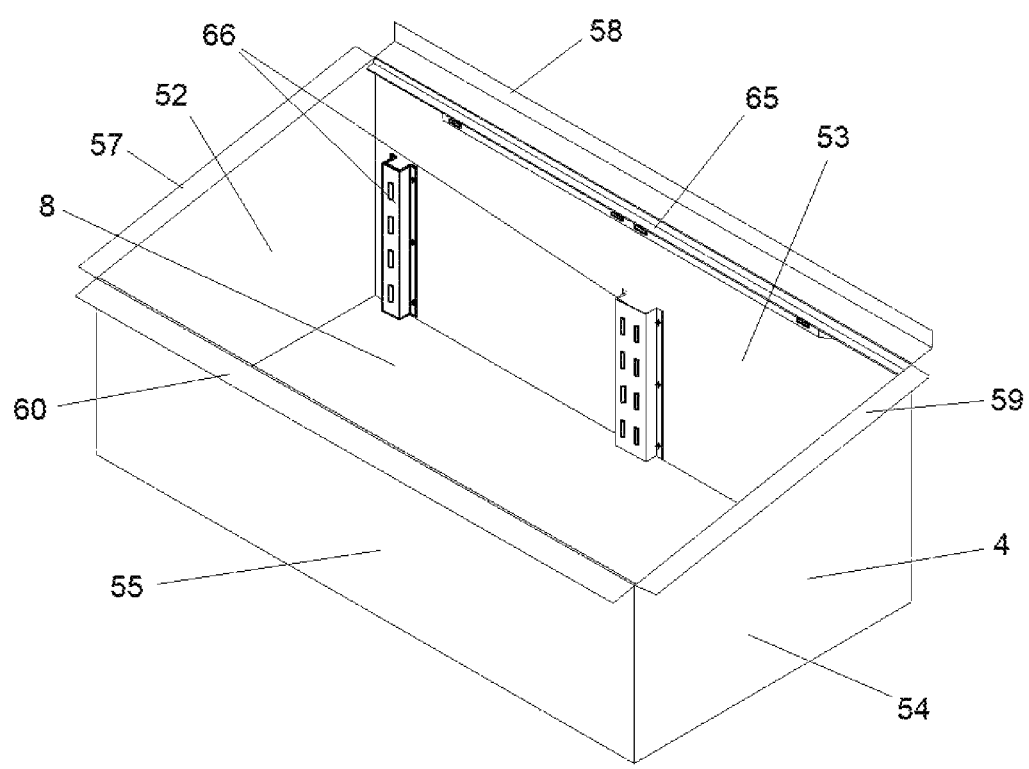
FIG. 8 depicts an isometric view of the useful tank (4) detailing additional components.

The useful tank (4) has anti-freezing spacers, wherein a lower anti-freezing spacer (11) is located in a parallel manner and near the lower inner face (12) of the useful tank, which while separated a distance (13) became the boundary of a temperature compensation chamber (34). In a similar manner, the useful tank (4) has in proximity to each of its four vertical inner faces (14), (15), (16), and (17) lateral anti-freezing spacers (18), (19), (20), and (21), correspondingly, located parallel to said walls and separated by a distance (27), generating the temperature compensation side chambers (35). The lower anti-freezing spacer (11), as well as the lateral spacers (18), (19), (20) and (21), contain through holes (23), distributed throughout the entire surface thereof, as shown in FIGS. 6 and 7.

The self-sustaining multi-tank cooler (1) of the present invention contains in the lower part of the outer tank (2) a machinery chamber (24), wherein a compressor (25), a continuous electric charge accumulator (26), an electric charger (75), a condenser, and a fan (38), are housed inside.

The useful tank comprises an array of LED lights (65) located at the upper periphery (32) of the rear wall (54) of the useful tank (4) connected to the continuous electric charge accumulator (26).

In the upper part of the self-sustaining multi-tank cooler (1), a sliding upper cover (28) is located, which closes the cooler. Said upper cover being a set of glass slide caps, coated on its inner faces with a pyrolytic film (29).

In the preferred embodiment, the self-sustaining multi-tank cooler (1) has a substantially rectangular parallelepiped shape, defined in this way by the outer tank (2) and the useful tank (4) which contains inside a cold chamber (8).

Additionally, as shown in FIGS. 1 and 2, the outer tank (2) can have on its lower base portability means (76) to facilitate the transport of the cooler (1) of the present invention. Preferably, the portability means (76) are wheels, but other known elements that facilitate their transport can be used.

Figure 9:
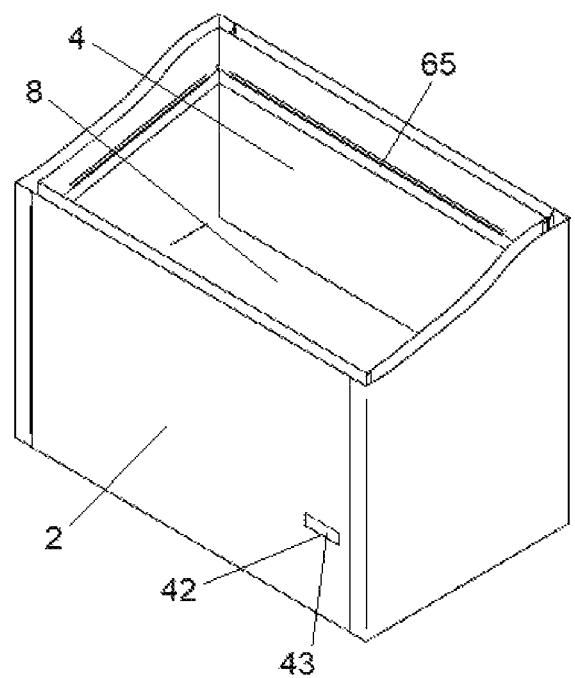
FIG. 9 depicts an isometric view of the outer body or cabinet (2) and the useful tank (4).

In addition, FIG. 9 shows that the outer tank (2) has a groove (42) on either side thereof to house a dual temperature electronic control (43).

The outer tank (2) is made of galvanized sheet, preferably caliber 26, having an inner surface and an outer surface painted with insulation by expanded polyurethane. Moreover, the present invention also contemplates the possibility that each wall of the outer tank (2) can have a double bottom that creates one or more intermediate wall cavities. In a preferred embodiment, the outer tank (2) also has moldings in corners and ridges, as well as insulating elements for a suitable finish of said tank.

Preferably, the self-sustaining cooler of multiple tanks of the preferred embodiment illustrated, includes a ⅓ hp compressor at 115 V cooled with R134a gas, a 9 Watt fan motor at 115 V, a 8" blade, a 10×10 spiral type condenser of 6-stages, and a copper contact evaporator, for example of 40 m.

The cooling tank (3) has at least one cable cover for mounting electrical elements to some useful operation of self-sustaining multi-tank cooler (1).

By way of example, in the preferred embodiment illustrated in FIG. 10, the evaporator (6) consists of different inter connected segments, such as the sections (72), (73), (74).

In a preferred embodiment, the cooling tank (3) has profiles that allow to hold upper panels (82), (83), (84), (85).

Moreover, the walls (52), (53), (54), (55) of the useful tank (4) have upper tabs (57), (58), (59), (60), for an adequate finishing of said useful tank (4), which allow to define the space between the cooling tank (3) and the useful tank (4). The useful tank has on its inner faces some leveling profiles (66) to divide the cold chamber (8) into one or more levels, to allow the accommodation of various products.

Each thermal energy accumulator (5) comprises a plastic container, preferably ABS injected, which contains a eutectic solution therein with a melting point of −5° C. The eutectic solution of the thermal energy accumulator (5) is a glycol mixture.

In accordance with FIG. 11, the distribution of the thermal energy accumulators (5) is defined by a front array (67), a first lateral array (68), a rear array (70), a second lateral array (69) and a bottom array (71). By way of example, for explanatory and non-limiting purposes, the front array (67) consists of nine accumulators (5), the lateral arrays (68) and (69) consisting of five accumulators (5), the rear array (70) consisting of thirteen accumulators (5) and the bottom array (71) consists of twelve accumulators. The configuration of the thermal energy accumulators (5) is in function of various factors, such as the operating temperature, the dimensions of the cooler, the type of products to be cooled, size and shape of the walls and bottom of the cooling tank (3), size and shape of the thermal energy accumulators (5), type of eutectic solution, capacity and components of the refrigeration system, heat transfer desired, type of intended use, outdoor climate, among others.

Another of the most relevant aspects of the invention is illustrated in FIG. 9 and is an electronic temperature control (43). In the preferred embodiment of the invention, the electronic temperature control (43) controls the components of the refrigeration system to preferably provide an operating mode at an average temperature of 2 to 5° C. and an operating mode at freezing temperature of −5° C. Preferably, the electronic temperature control (43) has a selection element that allows the operating temperature to be defined, as well as one or more light elements indicating which type of temperature is operating the self-sustaining multi-tank cooler (1). In addition, the electronic temperature control (43) has the function of controlling the elements of the refrigeration system when said system is connected and operating. A temperature sensor positioned inside the cabinet body for measuring the temperature of the interior wall of the cabinet, not the internal air, whereby the electronic temperature control (43) sends a start signal to the compressor, so that it starts the refrigeration system. Finally, it should be understood within the scope of the present invention that the cooler (1) is adaptable to two or more operating temperatures, as defined and configured to the sensors and to the electronic temperature control.

By way of example, for explanatory and non-limiting purposes, in the preferred embodiment of the invention, when the cooler (1) operates at medium temperature, the electronic temperature control (43) will stop the compressor once the sensor measures the temperature in the interior wall of the cabinet is 0° C.; and when the self-sustaining cooler (1) operates at freezing temperature, the electronic temperature control (43) will stop the compressor once the sensor measures the temperature in the interior wall of the cabinet is −5° C. For example, the temperature of the products in the geometric center of the cold chamber (8) will be between 2 and 4° C., with a lower temperature effect as the products are closer to the walls and/or the bottom, as well as of higher temperature as the products are closer to the upper door and further away from the walls, which tend to have up to 1° C. between the geometric center and the points farther away from it. In an alternative embodiment, the cooler (1) of the present invention may include an internal fan that homogenize the air and hence the temperature. For example, during the use of an embodiment of the invention, in the mode of operation at medium temperature, the product introduced into the cooler (1) with an average cold chain of 5° C. is placed in metal baskets (not shown) with an average spacing of 5 cm from the inner and bottom walls of the cold chamber, performing a thermal balance that maintains the product without reaching a freezing point that damages its characteristics and maintains the temperature defined between 2 to 5° C.

By way of example, during the use of an embodiment of the invention, in the mode of operation at freezing temperature, it is recommended not to place product into the interior of equipment, until the eutectic plates reach a freezing point of a "full charge", the freezing process of the thermal energy accumulators in a freezing temperature operating mode has a duration of between 8 and 10 hours, said accumulators thereafter arriving at their full charge freezing point. With the thermal energy accumulators charged, the system maintains a temperature at the point below the geometric center of the cabinet, contacting the bottom sheet at this point between −2 and 0° C. without the need for turning on the compressor, this enables the equipment to be completely disconnected from the power source which feeds the compressor and other elements of the refrigeration system.

For example, when the thermal energy accumulators are in the full charge state described above, the self-sustaining cooler (1) supports continuous usage to operate in medium temperature 2 to 5° C. for 8 continuous hours (for example, at ambient conditions of 25° C. with a maximum humidity of 65%), allowing for these 8 hours of continuous usage up to 10 openings per hour of the upper doors. Thus, the product will maintain its average temperature of 2 to 5°° C. due to the thermal load that the thermal energy accumulators exert on the product.

One of the additional advantages of the self-sustaining multi-tank cooler (1) of the present invention is that the self-sustaining cooler (1) can be moved or transported during these 8 hours without changes in position affecting the preservation performance of the products placed inside, considering that the conditions discussed in this example are maintained. Once the 8 hours have elapsed, the self-sustaining cooler (1) can be connected at any of the defined operating temperatures, either maintaining in medium temperature with product or restarting the charge operation of eutectic plates at the freezing temperature.

As will be understood by a skilled person in the art, it should be considered within the scope of the present invention, applying the same essential technical elements to all types of refrigeration device and equipment, for example, vertical refrigerators, buildings with cold chambers, freezing stores, cooling vehicles with cold chamber, among many others, as well as with shapes other than that of a rectangular parallelepiped. Likewise, the teachings of the present self-sustaining multi-tank cooler (1) are equally applicable to other commercial household uses, for laboratories, among others, where they will be adaptable to one or more operating temperatures required for those uses.

The invention claimed is:

1. A self-sustaining cooler of multiple tanks with thermal energy storage comprising:
   an outer tank within which a cooling tank and a useful tank are housed, where each tank is spaced with respect to each other, the useful tank being located within the cooling tank and said cooling tank within the outer tank, within the space between the cooling tank and the useful tank there is an array of thermal energy accumulators, said thermal energy accumulators being interconnected with each other and in contact with inner faces of the cooling tank and outer faces of the useful tank, wherein in the space between the cooling tank and the outer tank there is a thermal insulator, wherein an evaporator is formed by tubes which are in contact and distributed on outer faces of the cooling tank, where the evaporator tubes are covered and remain in contact with an aluminum layer which also contacts the outer faces of the cooling tank, wherein the useful tank comprises temperature compensation chambers and which are adjacent to anti-freezing spacers, wherein a lower anti-freezing spacer is aligned to a lower inner face of the useful tank, separated a distance and in proximity to each of four vertical inner faces of the useful tank, lateral anti-freezing spacers, located parallel to said walls and separated by a distance, said lower anti-freezing spacer and lateral anti-freezing spacers defining through holes;
   wherein at the lower part of the outer tank a machinery chamber, wherein a compressor, a continuous electric charge accumulator, a condenser, and a fan, are housed inside;
   wherein the useful tank comprises an array of LED lights located at an upper edge of a rear wall of the useful tank and connected to the electric charge accumulator;
   wherein at the top of the three tanks there is an upper cover having a pyrolytic film on an inner face of the upper cover; and
   wherein an electronic temperature controller is located inside a groove contained in the body of the outer tank.

2. The self-sustaining cooler of multiple tanks with thermal energy storage according to claim 1, wherein the evaporator tubes are arranged parallel to one another and longitudinally in vertical position on lateral outer faces of the cooling tank.

3. The self-sustaining cooler of multiple tanks with thermal energy storage according to claim 2, wherein the evaporator is formed by copper, steel or aluminum pipe.

4. The self-sustaining cooler of multiple tanks with thermal energy storage according to claim 1, wherein the cooler has a rectangular parallelepiped shape.

5. The self-sustaining cooler of multiple tanks with thermal energy storage according to claim 1, wherein the cover is hinged, manual sliding, or automatic sliding.

6. The self-sustaining cooler of multiple tanks with thermal energy storage according to claim 1, wherein the outer tank has wheels at the lower base.

7. The self-sustaining cooler of multiple tanks with thermal energy storage according to claim 1, wherein the outer tank is made of caliber 26 galvanized sheet, caliber, having an inner surface and an outer surface painted with expanded polyurethane.

8. The self-sustaining cooler of multiple tanks with thermal energy storage according to claim 1, wherein the cooling tank contains upper panels.

9. The self-sustaining cooler of multiple tanks with thermal energy storage according to claim 1, wherein the electronic temperature control has a temperature sensor placed inside the body of the outer tank.

10. The self-sustaining cooler of multiple tanks with thermal energy storage according to claim 1, wherein the thermal energy accumulators comprise a plastic container, preferably injected ABS, containing a eutectic solution therein with a glycol mixture.

* * * * *